Figure 1:
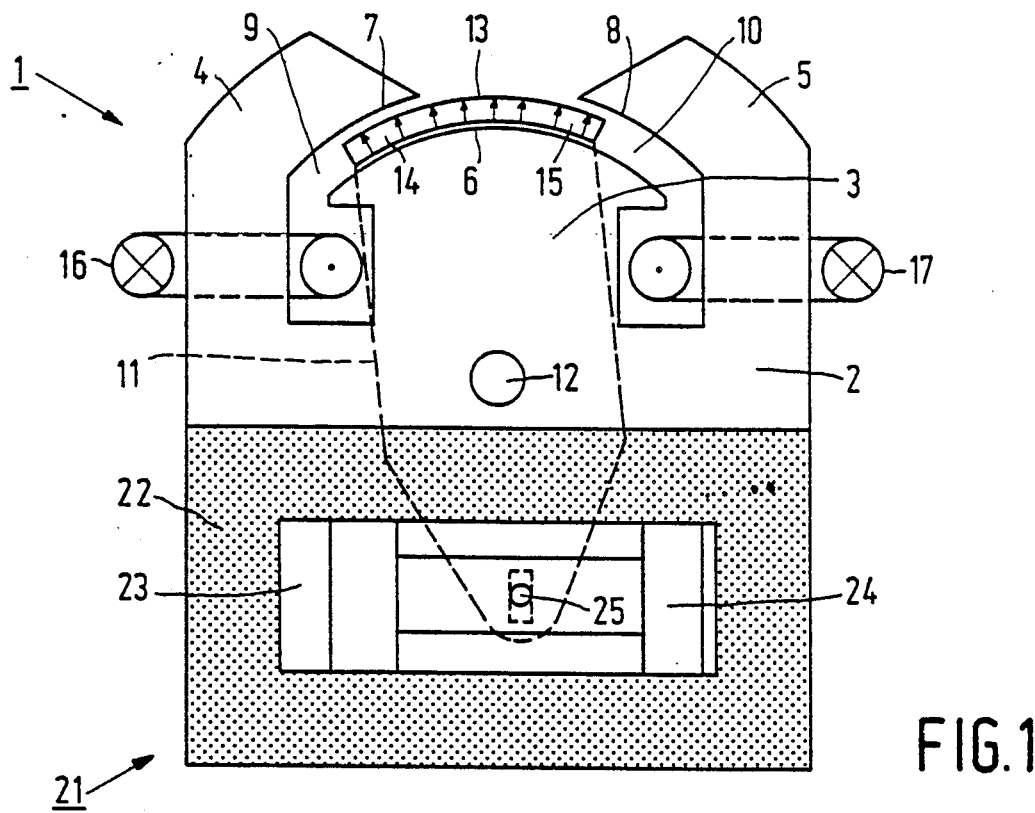

United States Patent [19]
Boon et al.

[11] Patent Number: 4,992,685
[45] Date of Patent: Feb. 12, 1991

[54] RECIPROCATING MOTOR-COMPRESSOR WITH W-SHAPED CORE

[75] Inventors: Fidelus A. Boon; Evert M. H. Kamerbeek, both of Eindoven, Netherlands

[73] Assignee: U.S. Philips Corporation, New York, N.Y.

[21] Appl. No.: 416,809

[22] Filed: Oct. 4, 1989

[30] Foreign Application Priority Data

Oct. 10, 1988 [NL] Netherlands ............... 8802471

[51] Int. Cl.[5] ........................................... H02K 33/16
[52] U.S. Cl. ................................ 310/37; 30/43.92; 310/80; 335/272; 417/415
[58] Field of Search ............... 30/43.92; 310/15, 36, 310/37, 38, 47, 49 R, 50, 116, 80; 417/415, 418; 335/272

[56] References Cited

U.S. PATENT DOCUMENTS

| | | | |
|---|---|---|---|
| 2,521,653 | 9/1950 | Ruud | 310/37 |
| 3,784,334 | 1/1974 | Hilgert | 417/415 |
| 4,700,090 | 10/1987 | Bianchi et al. | 310/36 |
| 4,810,915 | 3/1989 | Lissenburg et al. | 310/37 |

FOREIGN PATENT DOCUMENTS

| | | | |
|---|---|---|---|
| 1038888 | 10/1953 | France | 335/272 |
| 2016176 | 5/1970 | France | 310/36 |

*Primary Examiner*—Steven L. Stephan
*Assistant Examiner*—D. L. Rebsch
*Attorney, Agent, or Firm*—Bernard Tiegerman

[57] ABSTRACT

A motor-compressor unit comprising a vibration motor (1) having a single-part magnetizable stator (2) in the form of a W, arcuate air gaps (9, 10) being formed between the peripheral surface (6) of the central limb 3 of the W and each of the outer limbs (4, 5) of the W, and an armature (11) which is reciprocatingly pivotable about a motor shaft (12). The armature comprises at least one permanent magnet pole element (13), at least one coil (16, 17) arranged on the stator, an alternating current through the coil producing an oscillating movement of the armature (11), a compressor (21) having a linearly reciprocating piston (24) which is coupled to the armature (11), the coupling (25) being arranged diametrically opposite the pole element (13) relative to the motor shaft (12).

1 Claim, 1 Drawing Sheet

RECIPROCATING MOTOR-COMPRESSOR WITH W-SHAPED CORE

The invention relates to a motor-compressor unit comprising a vibration motor having a magnetizable stator, at least one coil arranged on the stator, arcuate air gaps between stator parts, an armature which is reciprocatingly pivotable about a motor shaft, which armature comprises at least one pole element such that the reciprocation of the armature causes the pole element or pole elements to move into and out of the air gaps, an alternating current through the coil causing the flux in the air gaps to increase and decrease alternately, and a compressor having a linearly reciprocating piston, the armature being coupled to the piston.

Such a motor-compressor unit is known from U.S. Pat. Specification No. 4,700,090.

It is an object of the invention to further improve such a motor-compressor unit and to this end the invention is characterized in that the stator is formed by a single part and has a W-shape, the air gaps being formed between the peripheral surface of the central limb of the W and each of the outer limbs of the W, in that the pole element is made of a permanent-magnet material, and in that relative to the motor shaft the coupling between the piston and the armature is arranged diametrically opposite the pole element.

Such a motor-compressor unit has several advantages in comparison with the motor compressor described in U.S. Pat. No. 4,700,090, namely:

it comprises only one stator part; as a result of this the size of the air gaps is less susceptible to tolerances than an air gap formed by assembling a plurality of stator parts, a pole element of a permanent-magnet material can be manufactured more cheaply than a multi-layer pole element of a magnetizable material, the motor-compressor unit is balanced more effectively, i.e. it is less susceptible to vibrations because the reactive forces acting on the motor shaft largely compensate for each other, the inductance of the motor coil is not only lower but also more constant, which is beneficial for the electronic control of the motor-compressor.

Figure 2:
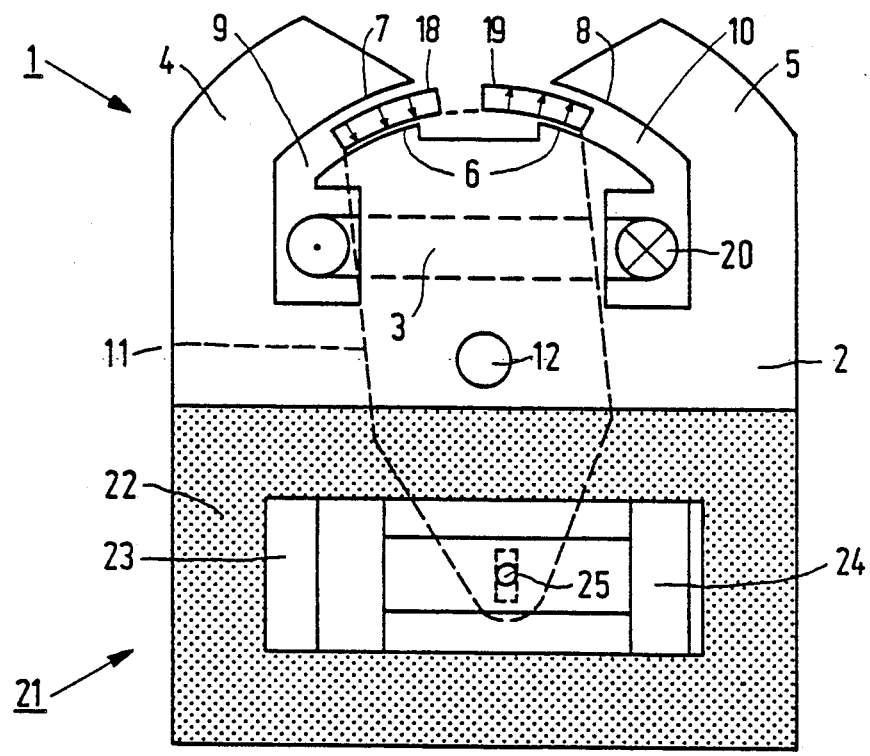

Two embodiments of the invention will now be described in more detail, by way of example, with reference to the drawing. In the drawing:

FIG. 1 shows diagrammatically a motor-compressor unit comprising one pole element, and FIG. 2 shows diagrammatically a motor-compressor unit comprising two pole elements.

The motor-compressor unit comprises a vibration motor 1 and a compressor 21, which are fixedly connected to one another. The vibration motor comprises only one stator part 2 whose shape may be defined as a W-shape (or M-shape), comprising a central limb 3 and two outer limbs 4, 5. The stator is made of a magnetizable material. Arcuate air gaps 9 and 10 are formed between the peripheral surface 6 of the central limb 3 and the respective ends 7 and 8 of the outer limbs 4 and 5. An armature 11 is rotatably supported on a motor shaft 12.

The motor shown in FIG. 1 is a homopolar motor, which means that the armature comprises one pole element 13 made of a permanent-magnet material and, preferably, polarized in a radial direction. The reciprocation of the armature 11 causes the pole element 13 to move in the air gaps 9 and 10 in such a way that when the armature is moved in, for example, the counter-clockwise direction the end 14 of the pole element is moved into the air gap 9 and the other end 15 is moved out of the air gap 10. Each outer limb 4 and 5 of the stator carries a coil 16 and 17 respectively. The coils are wound in such a way that an alternating current through the coils alternately causes the flux in one air gap to increase and the flux in the other air gap to decrease and vice versa. As a result of this, the pole element 13 and hence the armature 11 will experience an oscillating movement.

The motor shown in FIG. 2 is a heteropolar motor, which means that the armature comprises two pole elements 18 and 19, which may be interconnected and which are made of a permanent magnet material, one pole element being polarized oppositely relative to the other pole element. The central limb 3 carries a coil 20. Obviously, it is also possible to provide each outer limb with a coil. In that case one of the coils should be wound in a manner opposite to that shown in FIG. 1. Again an oscillating movement of the armature of the motor shown in FIG. 2 is obtained under the influence of an alternating current through the coil or coils.

The compressor 21 comprises a compressor block 22 in which the cylinder 23 is arranged. A piston 24 is arranged to perform a linear reciprocating movement in the cylinder. The piston 24 is coupled to the armature 11 by means of a coupling 25. Relative to the motor shaft 12 the coupling 25 is disposed diametrically opposite the pole element 13 (FIG. 1) or the pole elements 18, 19 (FIG. 2).

In the introductory part of the description it has already been stated that the motor-compressor unit in accordance with the present invention is balanced more effectively in comparison with the motor-compressor unit in accordance with U.S. Pat. No. 4,700,090. This may be explained as follows. In the motor-compressor unit in accordance with said U.S. Patent an alternating piston force produces an alternating reactive force on the motor shaft via the armature and hence on the entire motor-compressor unit, which is consequently excited into vibration. The pole elements of the armature are diametrically opposed relative to the motor shaft, so that the inertial forces compensate for each other and do not exert a reactive force on the motor shaft. When the motor-compressor construction in accordance with the invention is used there will also be an alternating reactive force on the motor shaft as a result of the alternating piston force. The alternating inertial force of the armature, however, now gives rise to an alternating reactive force on the motor shaft. However, these two reactive forces on the motor shaft are in phase opposition and largely cancel one another, so that the resulting reactive force on the motor shaft and the bearing is only minimal.

The introductory part of the description also states that the inductance of the motor is not only lower but also more constant. This may be explained as follows. In the motor in accordance with U.S. Pat. No. 4,700,090 the pole element is of a magnetizable material and consequently influences the inductance. When a pole element is drawn into an air gap two very small air gaps are formed in fact, so that a high inductance is obtained. If the pole element is withdrawn from the air gap the air gap becomes in fact substantially larger so that the inductance becomes several times smaller. This high and alternating inductance imposes stringent requirements on an electronic control of the motor compressor. In accordance with the present invention the pole elements are made of a permanent-magnet material. As regards the magnitude of the inductance permanent magnets exhibit a behavior similar to that of air. This means that in the present motor the inductance is not only lower because the air gap is larger but also that the inductance is constant because it is not affected by the movement of the permanent-magnet pole element into and out of said air gap. Therefore, the requirements imposed on an electronic control system can be less stringent.

We claim:

1. A motor-compressor comprising:
   a vibration motor having a magnetizable stator formed by a single part having a W-shape, including a central limb having first and second peripheral surfaces, and first and second outer limbs spaced apart from the first and second peripheral surfaces to form first and second air gaps;
   at least one coil arranged on the stator;
   a motor shaft;
   an armature pivotally mounted on the motor shaft and including at least one permanent magnet pole element movable into and out of the first and second air gaps;
   a compressor including a linearly reciprocating piston; and
   means for coupling the armature to the piston for maintaining the pole elements and the piston diametrically opposite with respect to the motor shaft.

* * * * *